United States Patent [19]
Dewitz

[11] Patent Number: 5,529,591
[45] Date of Patent: Jun. 25, 1996

[54] REVERSE FLOW SEPARATOR

[75] Inventor: Thomas S. Dewitz, Houston, Tex.

[73] Assignee: Shell Oil Company, Houston, Tex.

[21] Appl. No.: 361,077

[22] Filed: Dec. 21, 1994

[51] Int. Cl.$^6$ .................................................. B01D 45/00
[52] U.S. Cl. ............................... 55/263; 55/265; 55/318; 55/468; 95/108; 95/143; 96/150; 422/139; 422/147
[58] Field of Search ............................. 55/263, 265, 318, 55/438, 468; 422/139, 147; 95/108, 112, 143, 148; 96/122, 123, 130, 150, 145

[56] References Cited

U.S. PATENT DOCUMENTS

| | | | |
|---|---|---|---|
| 2,694,605 | 11/1954 | Berg | 55/318 |
| 4,313,910 | 2/1982 | Dries et al. | 55/265 |
| 4,348,364 | 9/1982 | Gartside et al. | 96/145 |
| 4,701,307 | 10/1987 | Walters et al. | 55/318 |
| 4,725,409 | 2/1988 | Wolf | 55/468 |

Primary Examiner—C. Scott Bushey

[57] ABSTRACT

Catalyst and hydrocarbon vapors are separated in separator-stripper vessel by a reverse flow separator assembly in a top portion of the separator vessel. The separator assembly contains a shrouded eductor where the particles and gas enter the eductor, and upon exit the gas reverses direction to travel through the passage between the eductor and the shroud, thus causing disengagement of the particles. The gas free of particles then passes out the vessel exit and the particles return to the particle bed in the lower portion of the vessel.

6 Claims, 2 Drawing Sheets

5,529,591

REVERSE FLOW SEPARATOR

FIELD OF THE INVENTION

This invention relates to a process and apparatus for improving the separation of fluid cracking catalyst particles from gaseous hydrocarbons and stripping of hydrocarbons from the catalyst. More particularly, the invention is concerned with improving the separation of catalyst particles from gaseous hydrocarbon conversion products from a stripper vessel in conjunction with a catalytic cracking process.

BACKGROUND OF THE INVENTION

Cracking catalysts are solid particles which catalyze the cracking of long chain hydrocarbons found in crude oil into shorter chain and more valuable hydrocarbons.

As a result of this process, spent catalyst particles are produced. These particles contain adsorbed hydrocarbons. For maximizing yield from the cracking process and to reutilize the catalyst, it is necessary to strip the adsorbed hydrocarbons from the particles. Such a stripping process typically occurs in a pressurized stripping vessel. Pressurization is needed since the stripping vessel is part of the overall process loop which includes the catalytic riser reactor and catalyst regenerator. To minimize power consumption, it is essential not to release pressure which occurs in the refinery process. Since pressurized vessels are costly, it is desirable not to size the vessels larger than necessary.

In the stripping vessel, a stripping gas such as steam is typically passed through a fluidized bed of catalyst particles. The steam is at an elevated temperature and strips at least some of the adsorbed hydrocarbons from the particles. The velocity of the steam, however, is sufficient to entrain some of the catalyst particles as the steam passes through the bed. After stripping the adsorbed hydrocarbons from the particles it is desired to pass those hydrocarbons on for further processing or collect them as end products. In either case, it is undesirable to have entrained catalyst particles in this stripped hydrocarbon product. Hence, it is necessary to separate these entrained particles from the stripped hydrocarbons.

Cyclones are a typical piece of apparatus used for solid-gas separation. Some cyclones have quite high separation efficiencies. By their nature, however, they are large and cumbersome in size and construction. A cyclone could be placed in the upper portion of the stripping vessel, but this would necessitate enlarging the vessel beyond the size necessary merely for the stripping process. The cyclone could be placed outside the vessel, but then another pressure vessel would be needed to contain the cyclone. Each alternative presents increased cost and maintenance concerns.

Technologies other than oil refining also require separation of solids and gases. Such processes include polymerization processes. Some polymerization processes result in a vessel containing the solid polymer product and some unreacted monomer feed components. To maximize yield and improve consistency of the polymer product, it is desired to separate the unreacted monomer from the polymer product. Such separation can be achieved in a stripping process similar to that used in the catalytic particle process discussed in the preceding paragraphs.

That is, a stripping gas such as steam is passed upward through a bed of the monomer/polymer mixture. The steam is at elevated temperatures and strips at least some of the monomer from the polymer. However, some of the polymer becomes entrained in the steam as it passes upward through the bed. Other solid-gas separation exist and include removing particulates from a factory environment. Typical removal technology currently in use involve large ventilation fans. Such fans have disadvantages of excessive noise, capital expense, and high power consumption.

Accordingly, It would be desirable to find a separation apparatus and process that did not require substantial head room in the stripping vessel or other type vessel and did not require a separate pressure vessel.

SUMMARY OF THE INVENTION

Catalyst and hydrocarbon vapors are separated in separator-stripper vessel by a reverse flow separator assembly in a top portion of the separator vessel. The separator assembly contains a shrouded eductor where the particles and gas enter the eductor, and upon exit the gas reverses direction to travel through the passage between the eductor and the shroud, thus causing disengagement of the particles. The gas free of particles then passes out the vessel exit and the particles return to the particle bed in the lower portion of the vessel. The invention includes the separation apparatus and the method of its utilization.

BRIEF DESCRIPTION OF DRAWING

The FIG. 1 depicts the a side cut away view of one embodiment of the apparatus of the invention.

DETAILED DESCRIPTION OF EMBODIMENTS OF THE INVENTION

Figure 1:
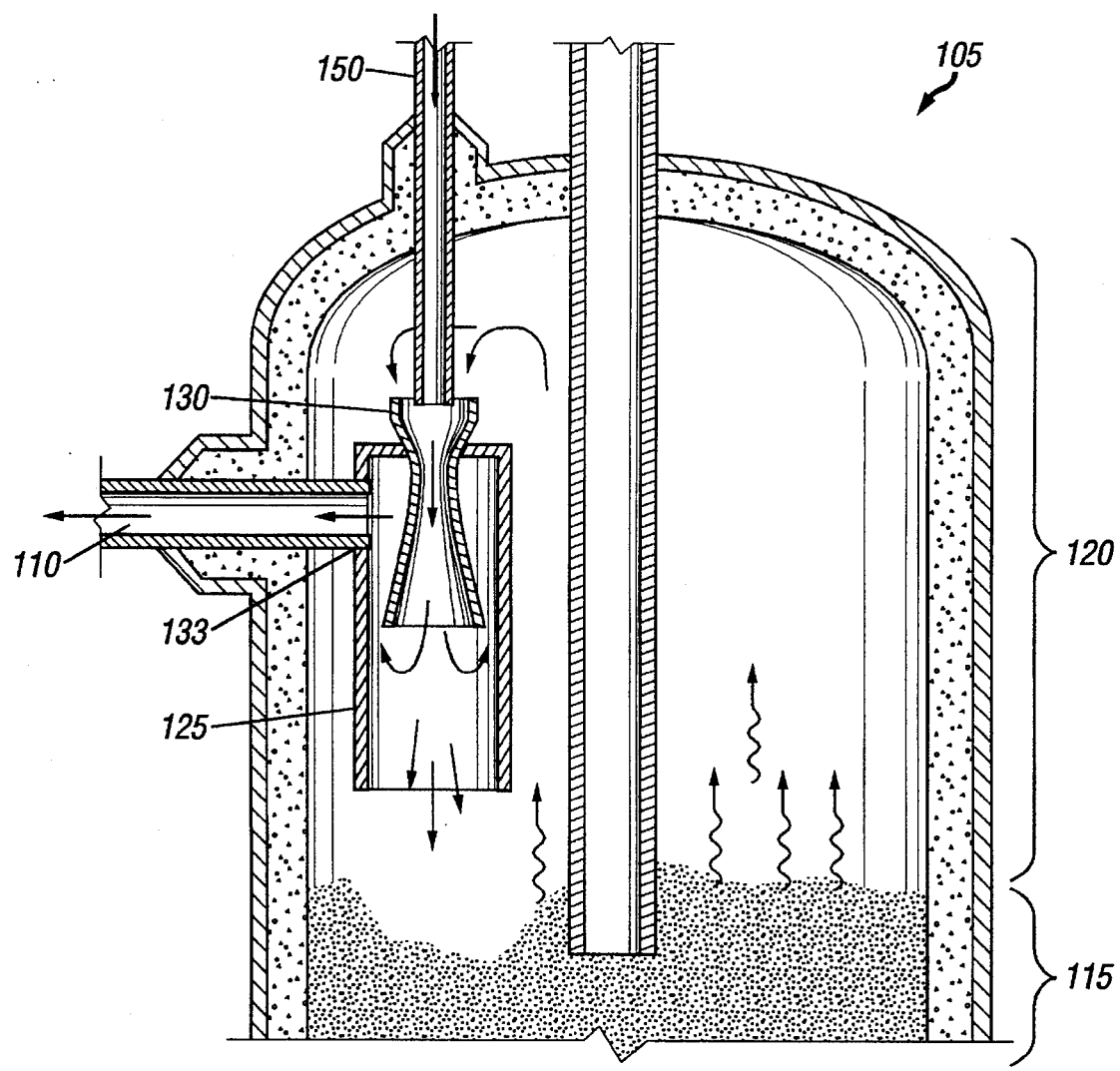
FIG. 1A depicts in one embodiment enlarged view of the eductor and shroud assembly of the invention.
Figure 1A:
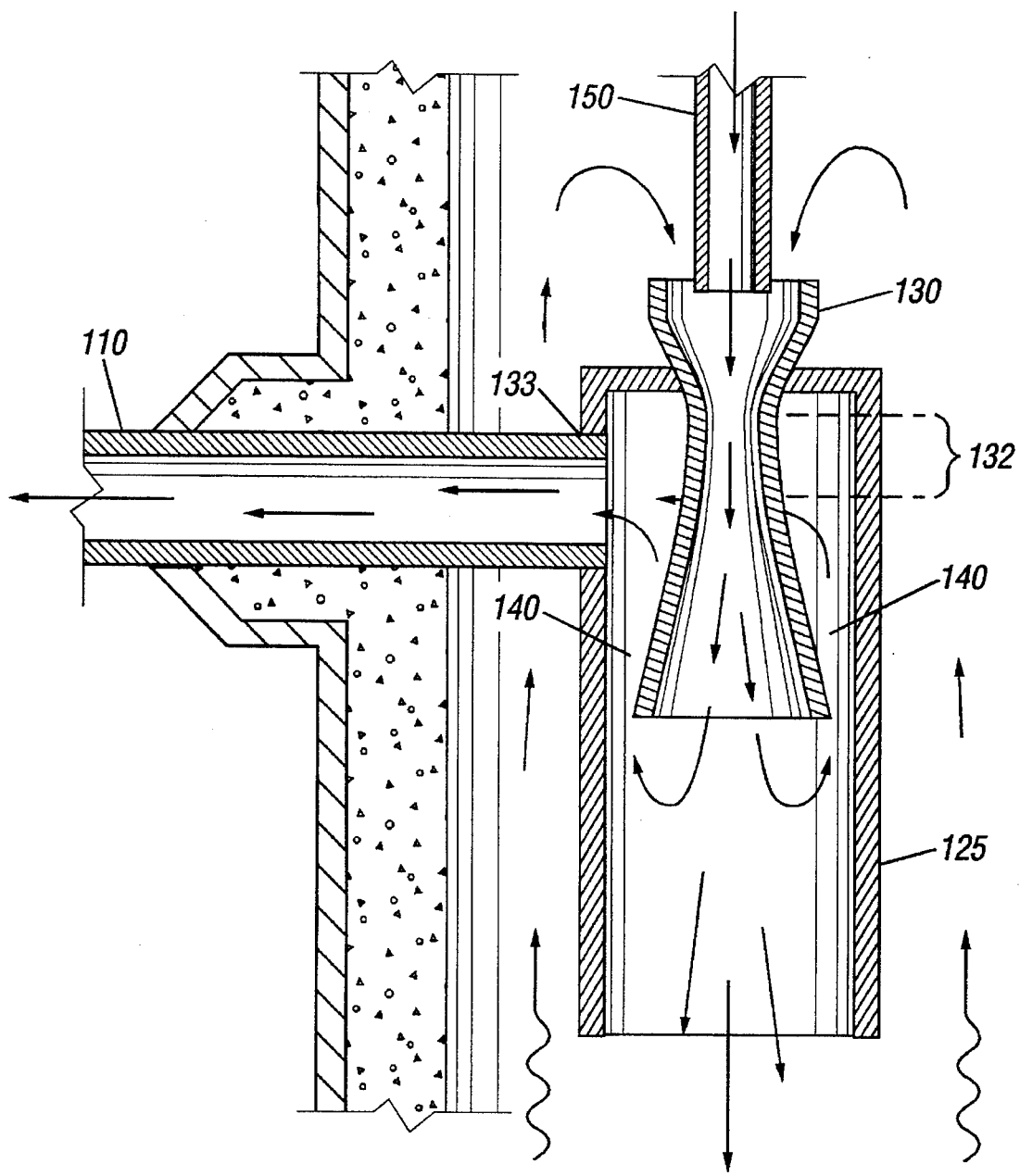

The invention includes a reverse flow separator device for separating solid catalyst particles from a gaseous medium. Reference is made to FIGS. 1 and 1A of the drawings.

A. Separator-Stripping Vessel

A separator-stripping vessel 105 has outlet 110, lower portion 115, and upper portion 120. Lower portion 115 is for containing a fluidized bed of catalytic cracking catalyst solid particles having petroleum products adsorbed thereon. Upper portion 120 is for containing steam and stripped vapor obtained from stripping the adsorbed petroleum products from the solid particles and containing solid particles entrained in the steam and stripped vapor.

B. Exhaust Shroud—Overview

A substantially cylindrical exhaust shroud 125 is disposed in the upper portion of the vessel. It is fixedly attached to the outlet of the vessel. It has side juncture 133 which is in fluid communication with outlet 110 of vessel 105. Exhaust shroud 125 has a closed top portion and an open bottom portion.

C. Eductor

A substantially cylindrical eductor 130 is typically fixedly attached within the exhaust shroud 125. Alternatively, the eductor could be fixedly attached to the steam conduit. Due to thermal expansion, however, the eductor should not be attached fixedly to both the steam conduit and the shroud. It is for educting the solid stripping particles entrained in steam and stripped vapor. Eductor 130 has an open top portion protruding through the closed top portion of the exhaust shroud 125. The open top portion is in fluid communication with the upper portion of vessel 105. The open top portion is for passage into the eductor of the solid stripping particles entrained in the steam and stripped vapor.

Eductor 130 is configured to accelerate the solid stripping particles. Typically, it has a venturi-shaped middle portion 132 for accelerating the solid stripping particles. The diameter of the venturi-shaped middle portion is typically from about 2 inches to about 18 inches, typically about 12 inches. Eductor 130 has an open bottom portion in fluid communication with the lower portion of the vessel. The diameter of the open bottom portion is typically from three to about ten times the diameter of the venturi-shaped middle portion. The open bottom portion is disposed lower in the vessel than the side port in the exhaust shroud.

While specific reference is made to a single eductor, the invention also includes assemblies where multiple eductors are used within a single exhaust shroud. Also, while the terms top and bottom are used and upper and lower, the invention is not limited to being vertically oriented. Since the process of separation relies on centrifugal forces and not on gravity, the orientation of the assembly may be sideways or otherwise non-vertical. Thus, as used in this specification and the appended claims, the terms top, bottom, upper, lower, refer to the elements of the device if it were in the vertical with the entrance at the top and the exit at the bottom, regardless of the actual orientation of the assembly.

D. Exhaust Shroud—Detail

The exhaust shroud 125 has a diameter sufficient to enclose the one or more eductors positioned within the exhaust shroud. The diameter of the exhaust shroud is from 6 to 60 inches, preferably from 6 to 24 inches. It has a side wall portion or side juncture 133 fixedly attached to the outlet 110 of vessel 105. The side juncture 133 is for directing the steam and stripped vapor substantially free of solid stripping particles through the exit 110 of the vessel 105.

Exhaust shroud has an open bottom portion which is lower than the open bottom portion of the eductor. The open bottom portion of the shroud 125 is for passage of the solid stripping particles out of the exhaust shroud and back into the lower portion of the vessel 105.

The inner diameter of the exhaust shroud is sufficiently close to the outer diameter of the lower end of the eductor so that radius of turn from out of the eductor and into the annular passage is sufficient so that the acceleration created by such turn causes disengagement from the gaseous medium of the majority of the solid particles and sufficiently great so to as to avoid excessive erosion of the shroud wall and excessive pressure drop.

The inner diameter of the exhaust shroud 125 is from about 0.5 inches to about 18 inches, or typically 12 inches, greater than the outer diameter of the lower end of the eductor, typically about 6 inches. The inner wall of the exhaust shroud and the outer wall of the eductor define an annular passage 140. This annular passage is for travel out of the vessel outlet for the steam and stripped vapor substantially free of solid particles exiting the open bottom portion of eductor 130.

E. Method of Operation

In operation of the apparatus of the invention or in practice of the method of the invention, the stripped vapor containing solid stripper particles enters the open top portion of the eductor 130. It is then accelerated through the venturi-shaped portion 132 of the eductor 130. After the venturi-shaped portion, the stripped vapor is passed out the open bottom portion of the eductor 130.

The direction of travel of the stripped vapor is reversed and at least a substantial portion of the solid particles are disengaged from the steam and stripped vapor. The stripped vapor passes through the annular passage 140. It then passes through the side port 133 of the exhaust shroud and passes out the exit 110 of the stripper vessel 105 substantially free of entrained solid stripper particles. The percent of solids removal is from about 80% to about 99.9%. Greater than 99.0% is preferable.

At least a majority of the solid particles pass out the open bottom portion of the exhaust shroud. The exhaust shroud has an open side portion in fluid connection with the outlet of the stripper vessel for directing passage of the steam and stripped vapor substantially free of solid stripping particles out of the exhaust shroud and out of the vessel.

F. Steam Conduit

Steam conduit 150 is for injecting steam into the open top portion of the eductor. The steam serves as a motive gas for educting the solid stripping particles entrained in steam and stripped vapor into the eductor. Steam conduit has an upper portion disposed through a wall of the stripper vessel. It has a lower portion terminating at or about the open top portion of the eductor.

Other embodiments of the invention will be apparent to those skilled in the art from a consideration of this specification or from practice of the invention disclosed herein. It is intended that the specification and examples be considered as exemplary only, with the true scope and spirit of the invention being indicated by the following claims.

What is claimed is:

1. A reverse flow separator device for separating solid catalyst particles from a gaseous medium, said reverse flow separator device comprising:

a. a separator-stripping vessel:
      (1) having an outlet:
      (2) having a lower portion for containing a fluidized bed of catalytic cracking catalyst solid particles having petroleum products adsorbed thereon; and
      (3) having an upper portion for containing steam and stripped vapor obtained from stripping said adsorbed petroleum products from said solid particles; and containing solid particles entrained in said steam and stripped vapor;

b. a substantially cylindrical exhaust shroud disposed in said upper portion of said vessel:
      (1) fixedly attached to said outlet of said vessel; and
        (a) having a side juncture for fluid communication with said outlet of said vessel;
      (2) having a closed top portion; and
      (3) having an open bottom portion;

c. a substantially cylindrical eductor fixedly attached within said exhaust shroud for educting said solid particles entrained in said steam and stripped vapor, said eductor:
      (1) having an open top portion:
        (a) protruding through said closed top portion of said exhaust shroud; and
        (b) in fluid communication with said upper portion of said vessel, for passage into said eductor of said solid particles entrained in said steam and stripped vapor;
      (2) said eductor having a venturi-shaped middle portion for accelerating said solid particles;
        (a) wherein the diameter of said venturi-shaped middle portion is from about 2 inches to about 12 inches;
      (3) said eductor has an open bottom portion in fluid communication with said lower portion of said vessel;

(a) wherein said open bottom portion is disposed lower in said vessel than said side juncture in said exhaust shroud;

d. said exhaust shroud:
(1) having a side wall portion fixedly attached to said outlet of said vessel, for directing said steam and stripped vapor substantially free of solid particles through said outlet of said vessel;
(2) having an open bottom portion, lower than said open bottom portion of said eductor, for passage of said solid particles out of said exhaust shroud and back into said lower portion of said vessel;
(3) the inner diameter of said exhaust shroud is from about 0.5 inches to about 6 inches greater than the outer diameter of the lower end of said eductor, wherein the inner wall of said exhaust shroud and the outer wall of said eductor define an annular passage for travel out of said vessel outlet for said steam and stripped vapor substantially free of solid particles exiting said open bottom portion of said eductor, wherein said stripped vapor containing solid particles;
(a) enters said open top portion of said eductor;
(b) is accelerated through said venturi-shaped portion of said eductor;
(c) is passed out said open bottom portion of said eductor; and wherein
(d) at least a substantial portion of said solid particles are disengaged from said steam and stripped vapor;
(e) wherein the direction of travel of said stripped vapor is reversed and said stripped vapor
(i) passes through said annular passage;
(ii) passes through said side juncture of said exhaust shroud; and
(iii) passes out of said outlet of said separator-stripping vessel substantially free of entrained solid particles; and
(iv) at least a majority of said solid particles pass out said open bottom portion of said exhaust shroud;
(4) having an open side portion in fluid connection with said outlet of said separator-stripping vessel for directing passage of said steam and stripped vapor substantially free of solid particles out of said exhaust shroud and out of said vessel; and
(e) a steam conduit for injecting steam into said open top portion of said eductor to serve as a motive gas for educting said solid particles entrained in steam and stripped vapor into said eductor; said steam conduit:
(1) having an upper portion disposed through a wall of said vessel; and
(2) having a lower portion terminating at or about said open top portion of said eductor.

2. A separation apparatus for separating solid particulates from a gaseous medium, said separation apparatus comprising:

a. a vessel containing solid particulates entrained in a gaseous medium;
(1) having an outlet;
(2) having a lower portion for containing a bed of solid particulates; and
(3) having an upper portion for containing said solid particulates entrained in said gaseous medium resulting from passing a gas upward through said bed of solid particulates;

b. an exhaust shroud disposed in said upper portion of said vessel;
(1) fixedly attached to said vessel; and
(a) being in fluid communication with said outlet of said vessel;
(2) having a closed top portion; and
(3) having an open bottom portion;

c. an eductor fixedly attached within said exhaust shroud for educting said solid particulates entrained in said gaseous medium, said eductor;
(1) having an open top portion:
(a) protruding through said closed top portion of said exhaust shroud; and
(b) in fluid communication with said upper portion of said vessel, for passage into said eductor of said solid particulates entrained in said gaseous medium;
(2) said eductor being configured for accelerating said solid particulates;
(3) said eductor has an open bottom portion in fluid communication with said lower portion of said vessel;
(4) wherein said solid particulates entrained in said gaseous medium enter said open top portion of said eductor; and wherein at least a portion of said gaseous medium is removed from said outlet of said vessel having a reduced amount of entrained solid particulates;
(d) said exhaust shroud:
(1) having a portion fixedly attached to said outlet of said vessel, for directing said gaseous medium having a reduced amount of entrained solid particulates through said outlet of said vessel;
(2) having an open bottom portion, lower than said open bottom portion of said eductor, for passage of said solid particulates out of said exhaust shroud and back into said lower portion of said vessel;
(3) wherein the inner wall of said exhaust shroud and the outer wall of said eductor define an annular passage;
(4) wherein the inner diameter of said exhaust shroud is sufficiently close to the outer diameter of the lower end of said eductor so that radius of turn out of the eductor and into said annular passage causes disengagement from said gaseous medium of a majority of said solid particulates and avoids excessive erosion of the shroud wall and excessive pressure drop; and
(5) having an open side portion in fluid connection with said outlet of said vessel;
(6) wherein said gaseous medium travels through said annular passage and out of said vessel outlet substantially free of solid particulates; and (e) a motive gas conduit for injecting a motive gas into said open top portion of said eductor for educting said solid particulates entrained in said gaseous medium into said eductor; said motive gas conduit;
(1) having an upper portion disposed through a wall of said vessel; and
(2) having a lower portion terminating at or about the open top portion of said eductor, wherein said lower portion is disposed to educt said particulates and gaseous medium into said eductor.

3. The separation apparatus of claim 2 wherein said solid particulates are catalytic cracking catalyst particles.

4. The separation apparatus of claim 1 wherein the diameter of the exhaust shroud is from about 6 inches to about 60 inches.

5. The separation apparatus of claim 1 wherein the diameter of the exhaust shroud is from about 6 inches to about 24 inches.

6. The separation apparatus of claim 2 wherein the inner diameter of said exhaust shroud is from about 0.5 inches to about 18 inches larger than the outer diameter of said open bottom portion of said eductor.

* * * * *